Nov. 27, 1934.  H. A. KNOX ET AL  1,981,867
TRACKLAYING VEHICLE
Filed Jan. 31, 1933
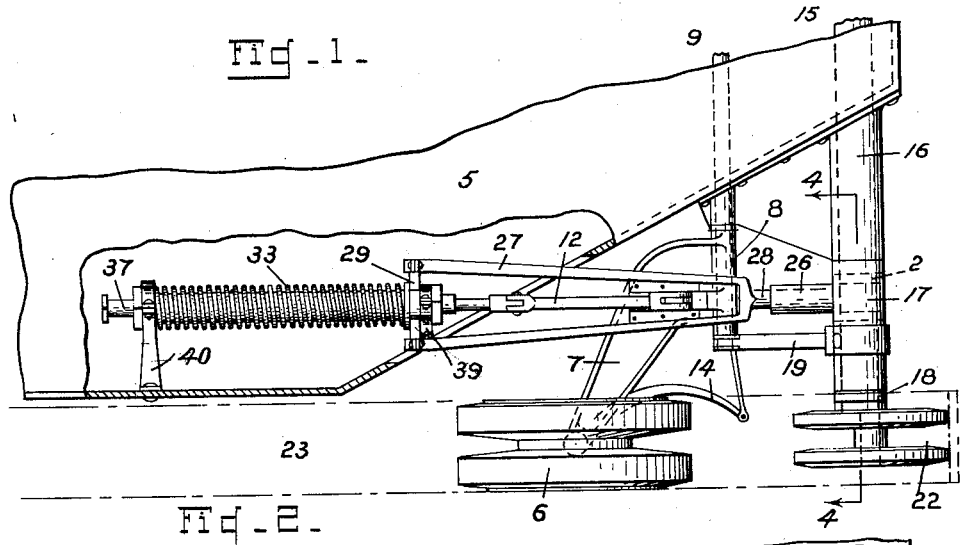
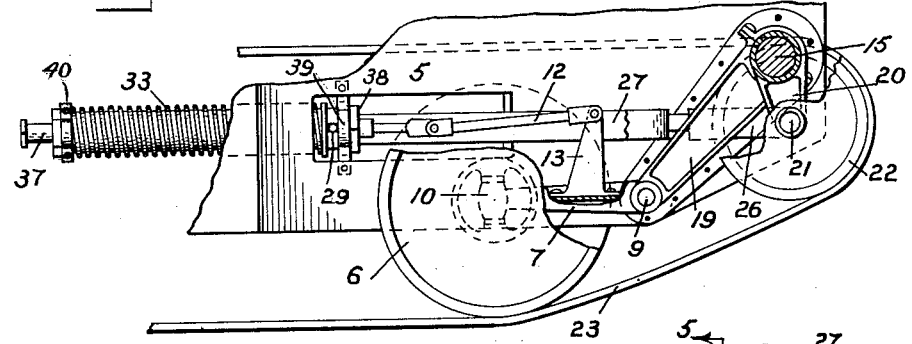
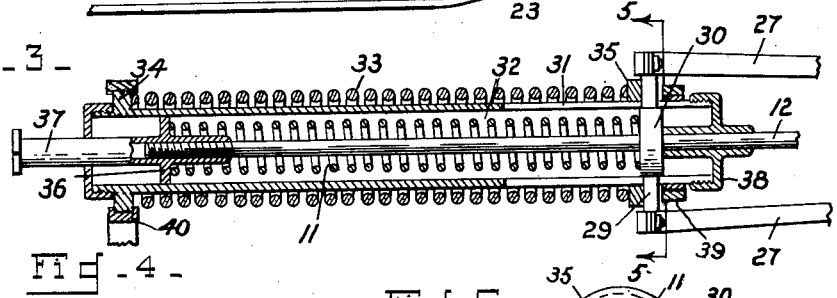
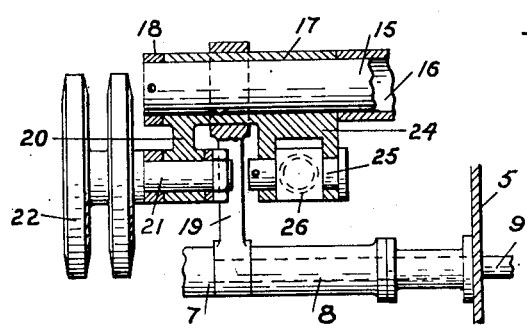
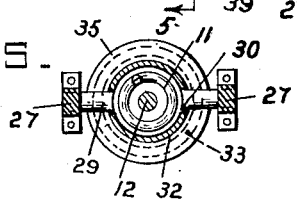
Inventors
Harry A. Knox
Bert F. Baker
By W. N. Roach
Attorney Patented Nov. 27, 1934

1,981,867

UNITED STATES PATENT OFFICE 1,981,867

TRACKLAYING VEHICLE

Harry A. Knox and Bert F. Baker, Davenport, Iowa

Application January 31, 1933, Serial No. 654,483

5 Claims. (Cl. 305—9)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a track-laying vehicle.

In track-laying vehicles it has been customary to provide a movably mounted track idler wheel to maintain the tension of the track. The purpose of the present invention is to associate the resilient track tensioning means with the resilient suspension means of one of the wheels and to utilize the suspension means in relieving the track.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a plan view with parts broken away of a portion of a vehicle showing the improved construction.

Fig. 2 is a view in side elevation with parts broken away of the far side of the vehicle.

Fig. 3 is a longitudinal sectional view of the suspension and tensioning means.

Fig. 4 is a detail sectional view on the line 4—4 of Fig. 1, and

Fig. 5 is a detail sectional view on the line 5—5 of Fig. 3.

Referring to the drawing by characters of reference there is shown the front portion of a vehicle body 5 which is mounted on wheels, of which only the front steering wheels 6 are shown. The connection between the body and each wheel 6 is effected by means of an arm or lever 7 whose inner end includes a horizontal sleeve 8 mounted on a shaft 9 carried by the body 5 and whose outer end includes a vertical sleeve 10 forming part of the knuckle joint of the steering wheel. The arm 7 is resiliently suspended by means of a spring 11 acting on a rod 12 that is secured to an upstanding bracket 13 fixed to the arm 7 intermediate its ends. The wheel 6 is steered by means of the levers 14. So much of the structure as has just been described is at present in use on armored convertible track-laying vehicles.

A large shaft 15 carried by the body 5 and additionally supported by a bracket 16 is positioned forwardly of and above the shaft 9. A sleeve 17 rotatably mounted on each end of the shaft 15 is confined between the bracket 16 and a retaining member 18. A brace 19 embracing the sleeve and mounted on the end of the shaft 9 provides an additional support for the shaft 15.

A depending arm 20 on the outer end of the sleeve receives the stub shaft 21 of an idler wheel 22 which is in alignment with the wheel 6 on the corresponding side of the vehicle. The idler wheel while being free to swing about the axis of the sleeve is adapted to support one end of an endless track 23 which is interposed between the ground and the wheel 6 and one or more of the wheels on the same side of the vehicle as indicated in Patent No. 1,336,131 of April 6, 1920. The sprocket for driving the track is not shown.

A second depending arm 24 receives a pin 25 that secures a socket member 26. A yoke 27 having a threaded stem 28 receivable in the socket member extends rearwardly and overlies the arm 7.

The ends of the yoke arms are pivotally mounted on pins 29—29 formed on a disk 30 and extending through slots 31 in a cylinder 32 that houses the spring 11. A spring 33 embracing the cylinder is confined between a fixed seat 34 on one end of the cylinder and a movable seat 35 in the form of a ring bearing against the pins 29.

The spring 11 is confined between the movable disk 30 and flange 36 formed on a sleeve 37 that threadedly engages the rod 12. The disk 30 is supported forwardly by the cover 38 on the cylinder. The cylinder is rigidly secured to the body in any approved manner, specifically by a front bracket 39 and a rear bracket 40.

In operation the normal tendency of the body 5 is to drop and produce a swinging action of the arm 7 about the hub of the wheel 6. This is counteracted by the spring 11 which through the rod 12 tends to elevate the arm 7. This method of providing a resilient suspension for the body is old in the art.

When the vehicle is operating with the endless track 23 in place, the slack of each track is taken up by the displaceable idler wheel 22 which is normally held in its foremost position through the action of the spring 33 and the yoke 27. If an obstruction such as stone, dirt or ice becomes lodged in a portion of the track that is about to engage one of the wheels, the track would have to increase its length if the idler is rigidly mounted. According to this invention the idler wheel being free to swing permits a decrease in the overall length of the track and relieves the tension of the track. The spring 11 of the suspension means acts with the spring 33 to yieldingly oppose the swinging of the idler wheel and to restore it to its normal position.

We claim:

1. In a vehicle, a body, a shaft carried by the lower part of the body, an arm having one end pivotally mounted on the shaft, a wheel to which the other end of the arm is attached, a rod attached to the arm, a cylinder carried by the body, a disk in the cylinder having pins projecting therefrom, a spring in the cylinder seated on the disk and acting on the free end of the rod, a shaft carried by the body forwardly of and above the lower shaft, a brace connecting the shafts, a depending arm pivotally mounted on the upper shaft, a track idler wheel carried by said arm, a yoke attached to said arm and to the pins on the disk, a spring embracing the cylinder and acting on the projecting pins on the disk, and a fixed seat on the cylinder for the other end of said spring.

2. In a vehicle, a body, an arm having one end pivotally mounted on the body, a wheel to which the other end of the arm is attached, a rod attached to the arm, a cylinder carried by the body, a disk in the cylinder having pins projecting therefrom, a spring in the cylinder seated on the disk and acting on the free end of the rod, a shaft carried by the body, a depending arm pivotally mounted on the shaft, a track idler wheel carried by said arm, a yoke attached to said arm and to the pins on the disk, a spring embracing the cylinder and acting on the projecting pins on the disk, and a fixed seat on the cylinder for the other end of said spring.

3. In a vehicle, a load member, a traction unit, a lever connecting the load member and traction unit, resilient means for suspending the lever from the load member, a swinging arm on the load member, a track idler wheel carried by said arm, and means including a spring acting in conjunction with the resilient suspension for yieldingly holding the swinging arm in a predetermined position.

4. In a vehicle, a load member, a traction unit, a lever connecting the load member and traction unit, resilient means for suspending the lever from the load member, a swinging arm on the load member, a track idler wheel carried by said arm, and means including the resilient suspension for yieldingly holding the swinging arm in a predetermined position.

5. In a vehicle, a load member, a traction unit, a resilient suspension means between the load member and traction unit, a track idler wheel mounted for movement longitudinally of the vehicle, and a coupling between the idler wheel and the resilient suspension means whereby the idler wheel is yieldingly held in a predetermined position.

HARRY A. KNOX.
BERT F. BAKER.